United States Patent

Nakao

(10) Patent No.: US 7,053,907 B2
(45) Date of Patent: May 30, 2006

(54) IMAGE DATA GENERATING APPARATUS

(75) Inventor: Hayato Nakao, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 343 days.

(21) Appl. No.: 10/628,332

(22) Filed: Jul. 29, 2003

(65) Prior Publication Data

US 2004/0027358 A1    Feb. 12, 2004

(30) Foreign Application Priority Data

Aug. 9, 2002    (JP) .............................. 2002-233791

(51) Int. Cl.
*G09G 5/00* (2006.01)
*G06T 11/40* (2006.01)
*G06T 17/00* (2006.01)

(52) U.S. Cl. ...................... 345/587; 345/552; 345/582; 345/428

(58) Field of Classification Search ................ 345/582, 345/587, 428, 552, 588
See application file for complete search history.

(56) References Cited

U.S. PATENT DOCUMENTS 6,304,268 B1 * 10/2001 Iourcha et al. .............. 345/428
6,417,860 B1 *  7/2002 Migdal et al. .............. 345/582
6,791,561 B1 *  9/2004 Dawson ...................... 345/582

FOREIGN PATENT DOCUMENTS

| JP | 2001-005996 | 1/2001 |
| JP | 2001-118083 | 4/2001 |
| JP | 2001-351122 | 12/2001 |
| JP | 2001-357412 | 12/2001 |

OTHER PUBLICATIONS

"The Official Guide to Learning OpenGL", Version 1.1, By Mason Woo et ala. (first page, pp. 317-318, 338-344 and last page; portions thereof are written in English).

* cited by examiner

*Primary Examiner*—Richard Hjerpe
*Assistant Examiner*—Hau Nguyen
(74) *Attorney, Agent, or Firm*—Louis Woo

(57) ABSTRACT

An input two-dimensional image is divided into equal-size blocks. MIP maps with different resolutions are generated in response to each of the blocks. A memory stores data representative of the MIP maps for each of the blocks. Polygon data represent conditions of a polygon and also a correspondence between the polygon and positions of pixels of a two-dimensional image to be applied to the polygon. On the basis of the polygon data, at least one is selected from the MIP maps represented by the data in the memory as a desired MIP map on a pixel-by-pixel basis. Data representative of the desired MIP map are read from the memory. Calculation is made as to a color intensity of each pixel in a final image in which the desired MIP map is applied to the polygon on a pixel-by-pixel basis. Data representative of each calculated pixel color intensity are outputted.

6 Claims, 3 Drawing Sheets

RESOLUTION L0
(ORIGINAL IMAGE)

RESOLUTION L1
(HALF OF ORIGINAL-IMAGE RESOLUTION L0)

RESOLUTION L2
(ONE FOURTH OF ORIGINAL-IMAGE RESOLUTION L0)

RESOLUTION L3
(ONE EIGHTH OF ORIGINAL-IMAGE RESOLUTION L0)

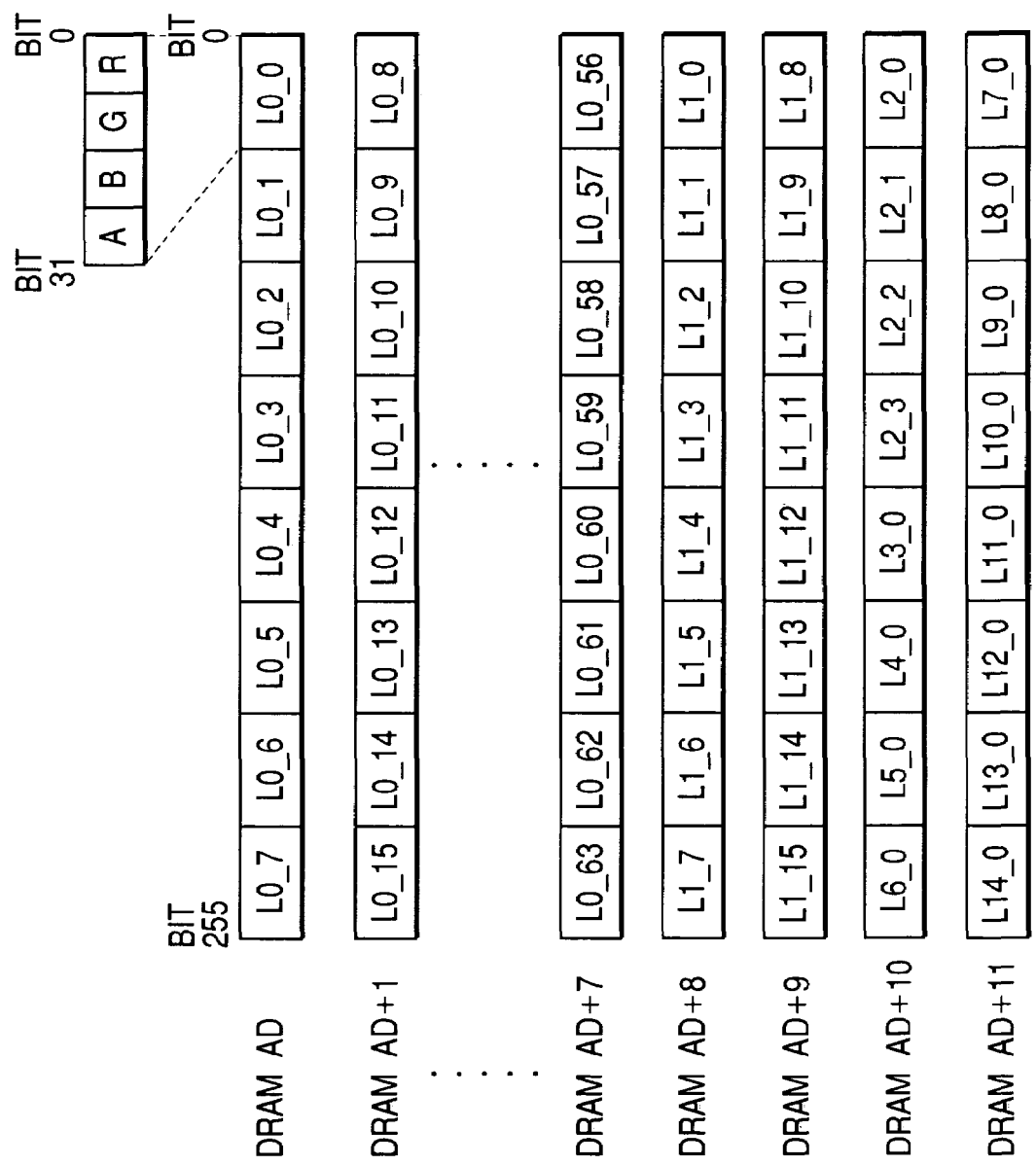

IMAGE DATA GENERATING APPARATUS

BACKGROUND OF THE INVENTION

1. Field of the Invention

This invention relates to an image data generating apparatus using MIP (multum in parvo) mapping. In addition, this invention relates to an apparatus for generating data representative of a two-dimensional image in which at least one three-dimensional object is stereographically indicated. Furthermore, this invention relates to an apparatus which defines an object in three-dimensional space as a group of basic-shape polygons to render the object, which includes a buffer storing data representing a luminance and a depth value (that is, a distance from a visual point) corresponding to the position of each of pixels arranged in a grid on a screen, and which uses the data in the buffer and thereby generates data representative of an object-corresponding image with surfaces including ones hidden on the basis of the depth values.

2. Description of the Related Art

In a general method of generating image data which is based on computer graphics (CG), an object in three-dimensional space, that is, a target to be rendered, is defined as a group of basic-shape polygons, and a buffer stores data representing a luminance and a depth value (that is, a distance from a visual point) corresponding to the position of each of pixels arranged in a grid on a screen. Then, the data in the buffer are used, and thereby data are generated which represent an object-corresponding image with surfaces including ones hidden on the basis of the depth values. The object-corresponding image is determined by the visual point and a light-source point in three-dimensional space, and is one as viewed from the visual point.

Texture mapping and MIP (multum in parvo) mapping are techniques for making an object-corresponding image visually closer to an original object.

The texture mapping is as follows. A two-dimensional image (a two-dimensional pattern) is prepared as a texture source image. The two-dimensional image is called a texture pattern or a texture map. The texture pattern (the texture map) is applied to the surfaces of polygons forming an object to be rendered.

The MIP mapping is one type of the texture mapping. The MIP mapping implements interpolation with respect to pixel data so that a texture pattern applied to polygons can be prevented from becoming unnatural when an object moves relative to a visual point.

Specifically, the MIP mapping is a technique which works by having multiple texture maps for each texture, each rendered at a different resolution. Different texture maps are then used to represent the image at various distances. In other words, the MIP mapping includes creating a series of MIP maps for each texture map and storing in memory the MIP maps of each texture map associated with the object being rendered. A set of MIP maps for a texture map includes a base map that corresponds directly to the texture map as well as a series of related filtered maps, where each successive map is reduced in size by a factor in each of the texture map dimensions.

In the case where the resolutions of MIP maps applied to pixels composing an image of an object are equalized, data processing can be simple. In this case, when the object has a great depth and the MIP-map resolution is relatively high, texture patterns applied to places corresponding to deep portions of the object tend to have aliasing. On the other hand, when the MIP-map resolution is relatively low, applied texture patterns tend to be insufficient in resolution.

In the case where the resolution of a MIP map applied to each pixel is designed to depend on the depth value of the pixel, aliasing and insufficient resolutions can be prevented from occurring. Generally, MIP maps have different resolution levels equal to integers, respectively. A desired resolution level for a pixel is calculated from the depth value of the pixel. The desired resolution level for the pixel may differ from the MIP-map resolution levels. For example, the desired resolution level is "1.5" while the MIP-map resolutions are "1", "2", "3", . . . . When the desired resolution level is "1.5", data representative of a MIP map with a resolution level of "1" and data representative of a MIP map with a resolution level of "2" are read out from a memory. Then, the MIP map with a resolution level of "1" and the MIP map with a resolution level of "2" are combined into a mixed map corresponding to a resolution level of "1.5". The mixed map is applied to the pixel.

In general, a two-dimensional image (MIP maps) applied to polygons is represented by a great amount of data. Dynamic random access memories (DRAMs) are large in capacity. It is known to use a DRAM in storing data representative of MIP maps with different resolution levels. In the case where a desired resolution level is "1.5", data representative of a MIP map with a resolution level of "1" are read out from first given addresses of the DRAM. Then, data representative of a MIP map with a resolution level of "2" are read out from second given addresses of the DRAM before the two MIP maps are mixed.

During the read-out of data of a MIP map with one resolution level from the DRAM, sequentially-accessed addresses in the DRAM are discontinuous when the vertexes of a polygon and the positions of corresponding pixels are in a certain relation. A typical static random access memory (SRAM) is smaller in capacity than a typical DRAM. The feature of an SRAM is as follows. Data can be transferred from discontinuous addresses of an SRAM at a high rate. It is known that an SRAM is provided in addition to a DRAM, and data representative of a required portion of a two-dimensional image which has a desired resolution level are transferred from the DRAM to the SRAM before an image represented by the data in the SRAM is applied to a polygon.

In the event that a desired resolution level of a two-dimensional image applied to a polygon varies from pixel to pixel in the polygon, two-dimensional image data are transferred from the DRAM to the SRAM to update data in the SRAM for each of pixels in the polygon. Therefore, in this case, the data processing rate is relatively low.

SUMMARY OF THE INVENTION

It is an object of this invention to provide an image data generating apparatus which prevents the data processing rate from considerably dropping even in the event that a desired resolution level of a two-dimensional image applied to a polygon varies from pixel to pixel in the polygon.

A first aspect of this invention provides an image data generating apparatus which defines an object in three-dimensional space as a group of basic-shape polygons to render the object, which includes a buffer storing data representing a luminance and a depth value corresponding to a position of each of pixels arranged in a grid on a screen, and which uses the data in the buffer and thereby generates data representative of an object-corresponding image with surfaces including ones hidden on the basis of the depth values. Each depth value means a distance to each pixel from a visual point. The apparatus comprises first means for dividing an input two-dimensional image into blocks each having a prescribed number of pixels arranged in a horizontal direction and a vertical direction; second means for assigning different block ID numbers to the respective blocks generated by the first means; third means for generating MIP maps with different resolutions in response to each of the blocks, a maximum resolution among the different resolutions being equal to a resolution of the input two-dimensional image; a memory storing data representative of the MIP maps generated by the third means for each of the blocks; fourth means for receiving polygon data representing an on-screen position of a polygon, a depth value of the polygon which means a distance to the polygon from a visual point, a luminance of the polygon, and a correspondence between the polygon and positions of pixels of a two-dimensional image to be applied to the polygon; fifth means for calculating, from the polygon data received by the fourth means, a block ID number corresponding to a desired MIP map among the MIP maps generated by the third means which is to be applied to the polygon, an intra-MIP-map-block position of the desired MIP map, and a resolution of the desired MIP map; sixth means for reading, from the memory, data representative of the desired MIP map in response to the block ID number, the intra-MIP-map-block position, and the resolution calculated by the fifth means; seventh means for calculating a luminance of each pixel in a final image in which the desired MIP map represented by the data read from the memory is applied to the polygon for each pixel position; and eighth means for outputting data representative of each pixel luminance calculated by the seventh means.

A second aspect of this invention provides an image data generating apparatus comprising first means for dividing an input two-dimensional image into blocks each having a prescribed number of adjacent pixels; second means for generating a group of MIP maps with different resolutions in response to each of the blocks; a first memory in which data representative of each of the MIP map groups generated by the second means are stored in successive addresses; a second memory; third means for transferring data representative of one among the MIP map groups from the first memory to the second memory; fourth means for selecting at least one among the MIP maps in the group represented by the data in the second memory in response to each on-screen pixel position related to an object to be rendered; and fifth means for using the MIP map selected by the fourth means on a pixel-by-pixel basis in rendering the object.

A third aspect of this invention provides an image data generating apparatus comprising first means for dividing an input two-dimensional image into blocks each having a prescribed number of adjacent pixels; second means for assigning different block ID numbers to the respective blocks generated by the first means; third means for generating MIP maps with different resolutions in response to each of the blocks; a memory storing data representative of the MIP maps generated by the third means for each of the blocks at successive addresses, the MIP maps for each of the blocks composing a MIP map block; fourth means for receiving polygon data representing an on-screen position of each pixel in a polygon, a depth value of the pixel in the polygon which means a distance to the pixel in the polygon from a visual point, a luminance of the pixel in the polygon, and a correspondence between the pixel in the polygon and positions of pixels of a two-dimensional image to be applied to the polygon; fifth means for calculating, from the polygon data received by the fourth means, a block ID number corresponding to a desired MIP map among the MIP maps generated by the third means which is to be applied to the polygon, an intra-MIP-map-block position of the desired MIP map, and a resolution of the desired MIP map; sixth means for reading, from the memory, data representative of the desired MIP map in response to the block ID number, the intra-MIP-map-block position, and the resolution calculated by the fifth means; seventh means for calculating a color intensity of each pixel in a final image in which the desired MIP map represented by the data read from the memory is applied to the polygon for each pixel position; and eighth means for outputting data representative of each pixel color intensity calculated by the seventh means.

BRIEF DESCRIPTION OF THE DRAWINGS

FIG. 7 is a diagram of conditions where data representative of MIP maps for one block are stored in a synchronous DRAM in FIG. 1.

DETAILED DESCRIPTION OF THE INVENTION

Figure 1:
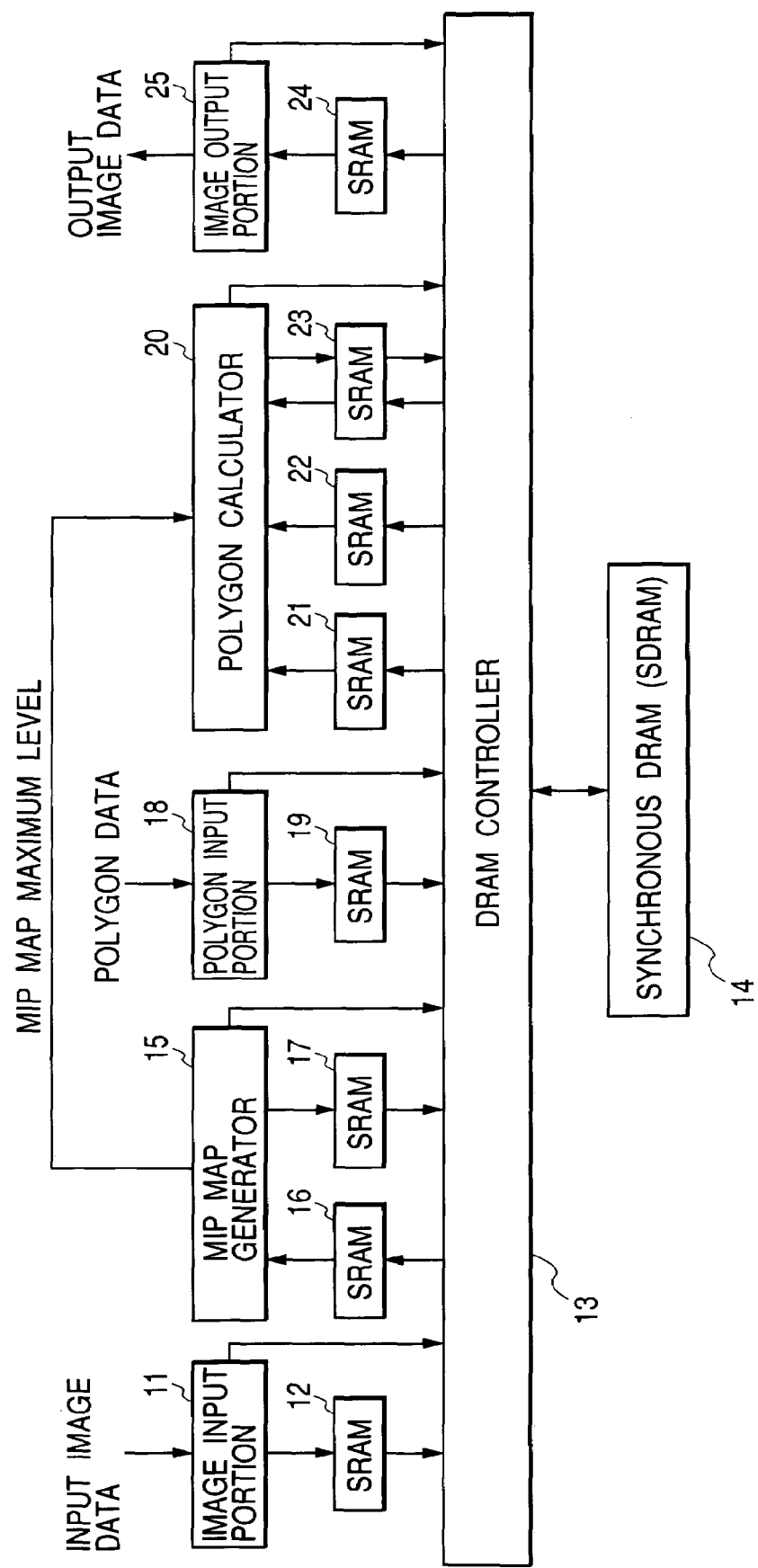
FIG. 1 is a block diagram of an image data generating apparatus according to an embodiment of this invention.

FIG. 1 shows an image data generating apparatus according to an embodiment of this invention. The apparatus of FIG. 1 includes an image input portion 11, an SRAM (a static random access memory) 12, a DRAM (dynamic random access memory) controller 13, a synchronous DRAM (SDRAM) 14, a MIP (multum in parvo) map generator 15, SRAMs 16 and 17, a polygon input portion 18, an SRAM 19, a polygon calculator 20, SRAMs 21, 22, 23, and 24, and an image output portion 25.

With reference to FIG. 1, data (image data) representing a two-dimensional image to be applied to a polygon or polygons are stored into the SRAM 12 via the image input portion 11. For example, the two-dimensional image is a texture pattern or a texture image. When the SRAM 12 is fully occupied by image data, the image input portion 11 outputs a write address and a write request to the DRAM controller 13.

Preferably, the image input portion 11 includes a first section for calculating the usable capacity in the SRAM 12, a second section for deciding whether or not the SRAM 12 is fully occupied by image data on the basis of the calculated usable capacity in the SRAM 12, and a third section for outputting a write address and a write request to the DRAM controller 13 when it is decided that the SRAM 12 is fully occupied by image data. Generally, the write address is periodically updated. The image input portion 11 may include a digital signal processor, a CPU, or a similar device operating in accordance with a control program stored therein. In this case, the control program is designed to implement the above-mentioned steps of operation of the image input portion 11.

The DRAM controller 13 transfers the image data from the SRAM 12 to the synchronous DRAM (SDRAM) 14 in response to the write address and the write request outputted by the image input portion 11. The image data are written into a place in the synchronous DRAM 14 which is designated by the write address.

The image data in the synchronous DRAM 14 are divided into segments corresponding to pixels (for example, texture elements called texels) respectively. The pixel-corresponding data segments are located at different addresses in the synchronous DRAM 14, respectively. The pixel-corresponding data segments are referred to as the pixel data.

The MIP map generator 15 outputs a read address and a read request to the DRAM controller 13. Generally, the read address is periodically updated. The DRAM controller 13 transfers pixel data from the synchronous DRAM 14 to the SRAM 16 in response to the read address and the read request outputted by the MIP map generator 15. The pixel data are read out from a place in the synchronous DRAM 14 which is designated by the read address. The MIP map generator 15 produces MIP maps from the pixel data in the SRAM 16. The MIP map generator 15 stores data representative of the produced MIP maps into the SRAM 17. Thereafter, the MIP map generator 15 outputs a write address and a write request to the DRAM controller 13. Generally, the write address is periodically updated. The DRAM controller 13 transfers the MIP map data from the SRAM 17 to the synchronous DRAM 14 in response to the write address and the write request outputted by the MIP map generator 15. The MIP map data are written into a place in the synchronous DRAM 14 which is designated by the write address.

The MIP map generator 15 may include a digital signal processor, a CPU, or a similar device operating in accordance with a control program stored therein. In this case, the control program is designed to implement the above-mentioned steps of operation of the MIP map generator 15 as well as later-mentioned steps of operation of the MIP map generator 15.

A two-dimensional image (for example, a texture pattern or a texture image) to be applied to a polygon or polygons is divided into blocks each having a given number of pixels arranged in a matrix, that is, arranged in horizontal rows and vertical columns. A group of MIP maps are generated for each of the blocks.

Figures 2, 3, 4, 5, 6:
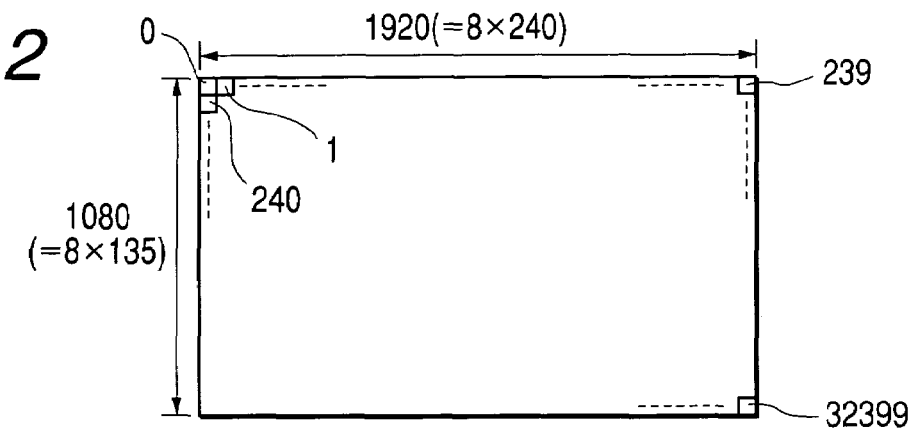
FIG. 2 is a diagram of a two-dimensional image divided into blocks each having a prescribed number of pixels.
FIG. 3 is a diagram of a MIP map having a resolution level L0.
FIG. 4 is a diagram of a MIP map having a resolution level L1 equal to half the resolution level L0.
FIG. 5 is a diagram of a MIP map having a resolution level L2 equal to one fourth of the resolution level L0.
FIG. 6 is a diagram of a MIP map having a resolution level L3 equal to one eighth of the resolution level L0.

With reference to FIG. 2, a two-dimensional image (for example, a texture pattern or a texture image) is composed of 1920 pixels in a horizontal direction by 1080 pixels in a vertical direction. The two-dimensional image is divided into blocks each composed of 8 pixels in the horizontal direction by 8 pixels in the vertical direction. Thus, the two-dimensional image is composed of 240 blocks in the horizontal direction by 135 blocks in the vertical direction. The blocks composing the two-dimensional image are serially numbered. Specifically, the leftmost block in the uppermost line (the uppermost row) in the two-dimensional image is assigned a block ID number of "0". The second leftmost block and the later blocks in the uppermost line are serially numbered as "1", "2", and "239" along the rightward direction. Thus, the rightmost block in the uppermost line in the two-dimensional image is assigned a block ID number of "239". The leftmost block in the second uppermost line (the second uppermost row) in the two-dimensional image is assigned a block ID number of "240". The second leftmost block and the later blocks in the second uppermost line are serially numbered as "241", "242", . . . along the rightward direction. Similarly, the blocks in the third uppermost line and the later lines in the two-dimensional image are serially numbered. Thus, the rightmost block in the lowermost line (the lowermost row) in the two-dimensional image is assigned a block ID number of "32399".

There are MIP maps having different resolution levels for each of the blocks. Each of MIP maps having resolution levels equal to or higher than a specified value corresponds to one block composed of 8 pixels by 8 pixels. As will be mentioned later, MIP maps having resolution levels lower than the specified value corresponds to four or more blocks.

With reference to FIG. 3, an original two-dimensional 1-block-corresponding image being a MIP map with a resolution level L0 (the highest resolution level) is composed of 64 pixels, that is, 8 pixels in a horizontal direction X and 8 pixels in a vertical direction Y. The number of pixels composing a MIP map with the resolution level L0 is equal to that of pixels composing one block. As shown in FIG. 3, the 64 pixels are serially numbered from "0" to "63" in the normal line-by-line scanning order (that is, from the top to the bottom and from left to right). FIG. 4 shows a two-dimensional image being a MIP map with a resolution level L1 which is composed of 16 pixels, that is, 4 pixels in the horizontal direction X and 4 pixels in the vertical direction Y. The resolution level L1 is equal to half the original-image resolution level (the highest resolution level) L0. As shown in FIG. 4, the 16 pixels are serially numbered from "0" to "15" in the normal line-by-line scanning order. For example, each of the 16 pixels composing a MIP map with the resolution level L1 is generated from 4 corresponding adjacent pixels in the original image by an averaging process. FIG. 5 shows a two-dimensional image being a MIP map with a resolution level L2 which is composed of 4 pixels, that is, 2 pixels in the horizontal direction X and 2 pixels in the vertical direction Y. The resolution level L2 is equal to one fourth of the original-image resolution level L0. As shown in FIG. 5, the 4 pixels are serially numbered from "0" to "3" in the normal line-by-line scanning order. For example, each of the 4 pixels composing a MIP map with the resolution level L2 is generated from 16 corresponding adjacent pixels in the original image by an averaging process. FIG. 6 shows a two-dimensional image being a MIP map with a resolution level L3 which consists of one pixel numbered as "0". The resolution level L3 is equal to one eighth of the original-image resolution level L0. For example, the pixel forming a MIP map with the resolution level L3 is generated from 64 corresponding adjacent pixels in the original image by an averaging process.

A two-dimensional image being a MIP map with a resolution level L4 corresponds to 4 blocks and consists of one pixel generated from 256 adjacent pixels (that is, 16 pixels in the horizontal direction by 16 pixels in the vertical direction) in the original image. For example, a MIP map with the resolution level L4 corresponds to blocks having ID numbers of "0", "1", "240", and "241" (see FIG. 2). The pixel forming the MIP map is generated by averaging 256 adjacent pixels (that is, 16 pixels in the horizontal direction by 16 pixels in the vertical direction) composing the blocks having ID numbers of "0", "1", "240", and "241" in the original image. A two-dimensional image being a MIP map with a resolution level L5 corresponds to 16 blocks and consists of one pixel generated from 1024 adjacent pixels (that is, 32 pixels in the horizontal direction by 32 pixels in the vertical direction) in the original image by, for example, an averaging process. A two-dimensional image being a MIP map with a resolution level L6 corresponds to 64 blocks and consists of one pixel generated from 4096 adjacent pixels (that is, 64 pixels in the horizontal direction by 64 pixels in the vertical direction) in the original image by, for example, an averaging process. In addition, MIP maps with resolution levels L7 to L14 are similarly generated.

FIG. 7 shows an example of conditions where data representative of two-dimensional images being different-resolution MIP maps are stored in the synchronous DRAM 14. With reference to FIG. 7, a group of different-resolution MIP maps for one block are stored in successive addresses AD to AD+11 of the synchronous DRAM 14. The group of different-resolution MIP maps for one block is referred to as a MIP map block. In FIG. 7, L0_0 to L0_63 denote successive storage locations for a MIP map having the resolution level L0, and L1_0 to L1_15 denote successive storage locations for a MIP map having the resolution level L1. The storage locations L1_0 to L1_15 follow the storage location L0_63. In FIG. 7, L2_0 to L2_3 denote successive storage locations for a MIP map having the resolution level L2, and L3_0 denotes a storage location for a MIP map having the resolution level L3. The storage location L3_0 follows the storage location L2_3. In FIG. 7, L4_0 to L14_0 denote successive storage locations for MIP maps having the resolution levels L4 to L14, respectively. The storage locations L4_0 to L14_0 follow the storage location L3_0. In the MIP map block of FIG. 7, the MIP maps with the different resolution levels have different intra-block positions respectively. Specifically, intra-block positions "0", "1", . . . , "64", . . . , and "95" correspond to the storage locations L0_0, L0_1, L1_0, and L14_0 respectively.

In the case where an original two-dimensional image (for example, a texture pattern or a texture image) is divided into blocks each having 8 pixels by 8 pixels, one MIP map block corresponding to one original-image block is composed of MIP maps assigned to the storage locations L0_0 to L14_0. Preferably, one original-image pixel (one original-image texel) is represented by data of 32 bits. The 32 bits are separated into four 8-bit groups assigned to red (R), green (G), blue (B), and opacity "α" respectively. For each of red (R), green (G), blue (B), 8 bits denote any one of different color intensities. Similarly, one MIP-map pixel (one MIP-map texel) is represented by data of 32 bits separated into four 8-bit groups assigned to red (R), green (G), blue (B), and opacity "α" respectively. For each of red (R), green (G), blue (B), 8 bits denote any one of different color intensities. One original-image block is represented by data of 2048 bits (32 by 8 by 8 bits). A MIP map with the resolution level L0 has 64 pixels. A MIP map with the resolution level L1 has 16 pixels. A MIP map with the resolution level L2 has 4 pixels. Each of MIP maps with the resolution levels L3 to L14 has one pixel. Therefore, one MIP map block is composed of 96 pixels. Thus, one MIP map block is represented by data of 3072 bits (32 by 96 bits).

Data representing one MIP map block are stored in the successive addresses AD to AD+11 of the synchronous DRAM 14 as shown in FIG. 7. Each of the storage locations L0_0 to L14_0 in FIG. 7 is assigned to data of 32 bits which represent one MIP-map pixel.

The previously-indicated red (R), green (G), and blue (B) are information pieces about three primary color signals representing a two-dimensional image to be used as a texture pattern. The previously-indicated value "α" denotes the opacity of the two-dimensional image. Data representing the opacity "α" have 8 bits. Thus, the opacity "α" can change among values of "0" to "255". The opacity values are defined as follows. The opacity "α" being equal to a value of "0" corresponds to a transparent state. The opacity "α" being equal to a value of "255" corresponds to an opaque state. The opacity "α" being equal to a value of "128" corresponds to a semitransparent state. For example, when a transparent film is applied to a transparent object, the opacity "α" is set to a value of "0". When an opaque film is applied to the transparent object, the opacity "α" is set to a value of "255". When a semitransparent film is applied to the transparent object, the opacity "α" is set to a value of "128".

The MIP map generator 15 may be designed to implement the following process. In the case where a two-dimensional image applied to a polygon or polygons has a resolution less than a specified value, the MIP map generator 15 produces only MIP maps with relatively low resolution levels and does not produce ones with relatively high resolution levels. The MIP map generator 15 notifies the polygon calculator 20 of the maximum among the resolution levels of produced MIP maps. In response to the maximum MIP-map resolution level, the polygon calculator 20 prevents the read-out of data from the storage locations in the synchronous DRAM 14 which are assigned to non-produced MIP maps, that is, MIP maps with relatively high resolution levels.

With reference back to FIG. 1, the polygon input portion 18 receives polygon data from an external device. The polygon data represent the on-screen positions of the vertexes of each polygon, and depth values which mean the distances to the polygon vertexes from a visual point. The polygon data further represent the luminances of the polygon vertexes, the opacities "α" of the polygon vertexes, and the correspondence between the polygon vertexes and the positions of pixels in the two-dimensional image to be applied to the polygon or polygons. The polygon input section 18 stores the polygon data into the SRAM 19. When the amount of polygon data in the SRAM 19 reaches a reference value, the polygon input portion 18 outputs a write address and a write request to the DRAM controller 13.

Preferably, the polygon input portion 18 includes a first section for calculating the amount of polygon data in the SRAM 19, a second section for deciding whether or not the calculated amount of polygon data in the SRAM 19 reaches the reference value, and a third section for outputting a write address and a write request to the DRAM controller 13 when it is decided that the calculated amount of polygon data in the SRAM 19 reaches the reference value. Generally, the write address is periodically updated. The polygon input portion 18 may include a digital signal processor, a CPU, or a similar device operating in accordance with a control program stored therein. In this case, the control program is designed to implement the above-mentioned steps of operation of the polygon input portion 18.

The DRAM controller 13 transfers the polygon data from the SRAM 19 to the synchronous DRAM 14 in response to the write address and the write request outputted by the polygon input portion 18. The polygon data are written into a place in the synchronous DRAM 14 which is designated by the write address.

The polygon calculator 20 outputs a read address and a read request to the DRAM controller 13. Generally, the read address is periodically updated. The DRAM controller 13 transfers polygon data from the synchronous DRAM 14 to the SRAM 21 in response to the read address and the read request outputted by the polygon calculator 20. The polygon data are read out from a place in the synchronous DRAM 14 which is designated by the read address. The polygon calculator 20 computes, from the polygon data in the SRAM 21, various parameters being ones related to each of pixels contained in a polygon of interest and ones related to a MIP map to be applied to the polygon. The pixel-related parameters include the on-screen position of each pixel, the depth value of each pixel which means the distance to each pixel from the visual point, the luminance of each pixel, and the opacity "α" of each pixel. The MIP-map-related parameters include the block ID number corresponding to the MIP map, the intra-MIP-map-block position of the MIP map, and the resolution level of the MIP map. Preferably, the polygon calculator 20 clips the computed MIP-map resolution level in response to the maximum MIP-map resolution level notified by the MIP map generator 15. Specifically, the polygon calculator 20 prevents the computed MIP-map resolution level from exceeding the maximum MIP-map resolution level.

The polygon calculator 20 decides whether data representative of a MIP map (a desired MIP map) to be applied to the polygon of interest are present in or absent from the SRAM 22. When it is decided that data representative of the desired MIP map are absent from the SRAM 22, the polygon calculator 20 computes a read address about the synchronous DRAM 14 from the ID number of a MIP map block containing the desired MIP map. Then, the polygon calculator 20 outputs the computed read address and a read request to the DRAM controller 13. Generally, the read address is periodically updated. The DRAM controller 13 transfers data representative of the MIP map block from the synchronous DRAM 14 to the SRAM 22 in response to the read address and the read request outputted by the polygon calculator 20. In this case, the pixel-corresponding data segments which represent the MIP map block are transferred from successive addresses of the synchronous DRAM 14 to successive addresses of the SRAM 22 respectively. Thus, the relation of the address succession with the pixel-corresponding data segments in the SRAM 22 is equivalent to that in the synchronous DRAM 14. The polygon calculator 20 computes target addresses in the SRAM 22 from the intra-MIP-map-block position and the resolution level of the desired MIP map. The polygon calculator 20 reads out data representative of the desired MIP map from the computed target addresses of the SRAM 22. The desired MIP map is composed of a pixel or pixels each having values of intensities of the primary colors (red, green, and blue) and an opacity "α".

There may be a plurality of desired MIP maps read from the SRAM 22 for one pixel. The number of desired MIP maps read from the SRAM 22 varies from 1 to 8 in accordance with a filter mode employed.

The synchronous DRAM 14 has an area used as a frame buffer (a frame memory) for storing data representing a matrix array of on-screen pixels. Specifically, data in the frame-buffer area of the synchronous DRAM 14 represent depth values, luminances (primary-color intensities), and opacities "α" of respective on-screen pixels. The depth values, the luminances (the primary-color intensities), and the opacities "α" represented by data in the frame-buffer area of the synchronous DRAM 14 are initialized by the DRAM controller 13 before the start of the object drawing process (the object rendering process).

In parallel with the read-out of the MIP map data from the SRAM 22, the polygon calculator 20 computes a read address about the frame-buffer area of the synchronous DRAM 14 from the on-screen position of a pixel of interest which is periodically changed from one to another. The polygon calculator 20 decides whether or not data representative of a depth value, a luminance (each of primary-color intensities), and an opacity "α" which correspond to the computed read address are present in or absent from the SRAM 23. When it is decided that the data in question are absent from the SRAM 23, the polygon calculator 20 returns current data from the SRAM 23 to the frame-buffer area of the synchronous DRAM 14. Then, the polygon calculator 20 outputs the computed read address and a read request to the DRAM controller 13. The DRAM controller 13 transfers requested data representative of a depth value, a luminance (each of primary-color intensities), and an opacity "α" from the frame-buffer area of the synchronous DRAM 14 to the SRAM 23 in response to the read address and the read request outputted by the polygon calculator 20.

The polygon calculator 20 computes an address in the SRAM 23 from the on-screen position of a pixel of interest which is periodically changed from one to another. The polygon calculator 20 reads, from the computed address of the SRAM 23, data representative of a depth value, a luminance (each of primary-color intensities), and an opacity "α" which correspond to the on-screen position of the pixel of interest. The polygon calculator 20 computes a final luminance (each of final primary-color intensities) of the pixel of interest from the parameters which include the depth value, the luminance, and the opacity "α" represented by the data read out from the SRAM 23, the depth value, the luminance, and the opacity "α" calculated from the polygon data, and the color intensities and the opacity "α" of the desired MIP map (or each of the desired MIP maps). The polygon calculator 20 decides whether or not the depth value calculated from the polygon data is smaller than the depth value represented by the data read out from the SRAM 23. When it is decided that the depth value calculated from the polygon data is smaller than the depth value represented by the data read out from the SRAM 23, the polygon calculator 20 writes data representative of the depth value calculated from the polygon data and data representative of the final luminance (each of the final primary-color intensities) into the corresponding address of the SRAM 23 to implement updating. Otherwise, the polygon calculator 20 does not update the corresponding data in the SRAM 23. In this case, the luminance (each of the primary-color intensities) of the pixel of interest which is represented by the data in the SRAM 23 is defined as final one. These processes correspond to a step of providing a hidden surface.

The polygon calculator 20 outputs a write address and a write request to the DRAM controller 13. Generally, the write address is periodically updated. The DRAM controller 13 transfers data representative of the final luminances (the final primary-color intensities) of pixels from the SRAM 23 to the frame-buffer area of the synchronous DRAM 14 in response to the write address and the write request outputted by the polygon calculator 20. The luminance data (the primary-color intensity data) are written into a place in the frame-buffer area of the synchronous DRAM 14 which is designated by the write address.

The polygon calculator 20 may include a digital signal processor, a CPU, or a similar device operating in accordance with a control program stored therein. In this case, the control program is designed to implement the above-mentioned steps of operation of the polygon calculator 20.

After the polygon calculator 20 completes the polygon data processing, the image output portion 25 outputs a read address and a read request to the DRAM controller 13. Generally, the read address is periodically updated. The DRAM controller 13 transfers data representative of the final luminances (the final primary-color intensities) of pixels from the frame-buffer area of the synchronous DRAM 14 to the SRAM 24 in response to the read address and the read request outputted by the image output portion 25. The luminance data (the primary-color intensity data) are read out from a place in the frame-buffer area of the synchronous DRAM 14 which is designated by the read address. The image output portion 25 transfers the data representative of the final luminances (the final primary-color intensities) of pixels from the SRAM 24 to an external device such as a display.

The image output portion 25 may include a digital signal processor, a CPU, or a similar device operating in accordance with a control program stored therein. In this case, the control program is designed to implement the above-mentioned steps of operation of the image output portion 25.

The DRAM controller 13 may include a digital signal processor, a CPU, or a similar device operating in accordance with a control program stored therein. In this case, the control program is designed to implement the above-mentioned steps of operation of the DRAM controller 13.

As previously mentioned, one MIP map block is composed of MIP maps having the resolution levels L0 to L14. Data representative of one MIP map block are located at successive addresses in the synchronous DRAM 14. Thus, MIP maps having different resolution levels can be successively transferred from the synchronous DRAM 14. Accordingly, even in the case where a desired resolution level of a two-dimensional image to be applied to a polygon varies from pixel to pixel in the polygon, desired MIP maps can be transferred from the synchronous DRAM 14 at a high rate. The high-rate transfer of desired MIP maps from the synchronous DRAM 14 causes a high data processing rate.

Advantage Provided by the Invention

MIP maps with different resolution levels are prepared as two-dimensional images to be applied to polygons. One MIP map block generally corresponding to one image block is composed of MIP maps with different resolution levels. Data representative of one MIP map block are located at successive addresses in a memory. Thus, MIP maps having different resolution levels can be successively transferred from the memory. The block ID number corresponding to a desired MIP map to be applied to a polygon, the intra-MIP-map-block position of the desired MIP map, and the resolution level of the desired MIP map are calculated from the on-screen positions and depth values of pixels composing the polygon. The depth values of pixels mean the distances to the pixels from a visual point. Even in the case where a desired resolution level of a two-dimensional image to be applied to a polygon varies from pixel to pixel in the polygon, desired MIP maps can be successively transferred from the memory. Thus, the transfer of desired MIP maps from the memory can be implemented at a high rate. The high-rate transfer of desired MIP maps from the memory prevents the occurrence of a considerable drop in the data processing rate.

What is claimed is:

1. An image data generating apparatus which defines an object in three-dimensional space as a group of basic-shape polygons to render the object, which includes a buffer storing data representing a luminance and a depth value corresponding to a position of each of pixels arranged in a grid on a screen, and which uses the data in the buffer and thereby generates data representative of an object-corresponding image with surfaces including ones hidden on the basis of the depth values, each depth value meaning a distance to each pixel from a visual point, the apparatus comprising:

first means for dividing an input two-dimensional image into blocks each having a prescribed number of pixels arranged in a horizontal direction and a vertical direction;

second means for assigning different block ID numbers to the respective blocks generated by the first means;

third means for generating MIP maps with different resolutions in response to each of the blocks, a maximum resolution among the different resolutions being equal to a resolution of the input two-dimensional image, a number of the generated MIP maps being equal to or less than a predetermined maximum number;

a memory having storage portions assigned to the predetermined maximum number of different-resolution MIP mans respectively for each of the blocks, data segments representative of the MIP maps generated by the third means being stored in assigned ones among the storage portions respectively for each of the blocks;

fourth means for receiving polygon data representing an on-screen position of a polygon, a depth value of the polygon which means a distance to the polygon from a visual point, a luminance of the polygon, and a correspondence between the polygon and positions of pixels of a two-dimensional image to be applied to the polygon;

fifth means for calculating, from the polygon data received by the fourth means, a block ID number corresponding to a desired MIP map among the MIP maps generated by the third means which is to be applied to the polygon, an intra-MIP-map-block position of the desired MIP map, and a resolution of the desired MIP map;

sixth means for reading, from the memory, a data segment representative of the desired MIP map in response to the block ID number, the intra-MIP-map-block position and the resolution calculated by the fifth means while preventing data read-out from the storage portions except the assigned ones;

seventh means for calculating a luminance of each pixel in a final image in which the desired MIP map represented by the data segment read from the memory is applied to the polygon for each pixel position; and eighth means for outputting data representative of each pixel luminance calculated by the seventh means.

2. An image data generating apparatus as recited in claim 1, wherein the number of the MIP maps generated by the third means depends on a resolution of the input two-dimensional image.

3. An image data generating apparatus comprising:

first means for dividing an input two-dimensional image into blocks each having a prescribed number of adjacent pixels;

second means for generating a group of MIP maps with different resolutions in response to each of the blocks, a number of the generated MIP maps in each of the MIP map groups being equal to or less than a predetermined maximum number;

a first memory having storage portions assigned to the predetermined maximum number of different-resolution MIP maps respectively for each of the blocks, data segments representative of the MIP maps in each of the MIP map groups generated by the second means being stored in assigned ones among the storage portions respectively for each of the blocks;

a second memory;

third means for transferring data representative of one among the MIP map groups from the first memory to the second memory while preventing data read-out from the storage portions except the assigned ones;

fourth means for selecting at least one among the MIP maps in the group represented by the data in the second memory in response to each on-screen pixel position related to an object to be rendered; and fifth means for using the MIP map selected by the fourth means on a pixel-by-pixel basis in rendering the object.

4. An image data generating apparatus as recited in claim 3, wherein the number of the generated MIP maps in each of the MIP map groups depends on a resolution of the input two-dimensional image.

5. An image data generating apparatus comprising:

first means for dividing an input two-dimensional image into blocks each having a prescribed number of adjacent pixels;

second means for assigning different block ID numbers to the respective blocks generated by the first means;

third means for generating MIP maps with different resolutions in response to each of the blocks, a number of the generated MIP mans being equal to or less than a predetermined maximum number;

a memory having storage portions assigned to the predetermined maximum number of different-resolution MIP maps respectively, data segments representative of the MIP maps generated by the third means for each of the blocks being stored in assigned ones among the storage portions respectively, the MIP maps for each of the blocks composing a MIP map block;

fourth means for receiving polygon data representing an on-screen position of each pixel in a polygon, a depth value of the pixel in the polygon which means a distance to the pixel in the polygon from a visual point, a luminance of the pixel in the polygon, and a correspondence between the pixel in the polygon and positions of pixels of a two-dimensional image to be applied to the polygon;

fifth means for calculating, from the polygon data received by the fourth means, a block ID number corresponding to a desired MIP map among the MIP maps generated by the third means which is to be applied to the polygon, an intra-MIP-map-block position of the desired MIP map, and a resolution of the desired MIP map;

sixth means for reading, from the memory, a data segment representative of the desired MIP map in response to the block ID number, the intra-MIP-map-block position, and the resolution calculated by the fifth means while preventing data read-out from the storage portions except the assigned ones;

seventh means for calculating a color intensity of each pixel in a final image in which the desired MIP map represented by the data segment read from the memory is applied to the polygon for each pixel position; and eighth means for outputting data representative of each pixel color intensity calculated by the seventh means.

6. An image data generating apparatus as recited in claim 5, wherein the number of the MIP maps generated by the third means depends on a resolution of the input two-dimensional image.

* * * * *